UNITED STATES PATENT OFFICE.

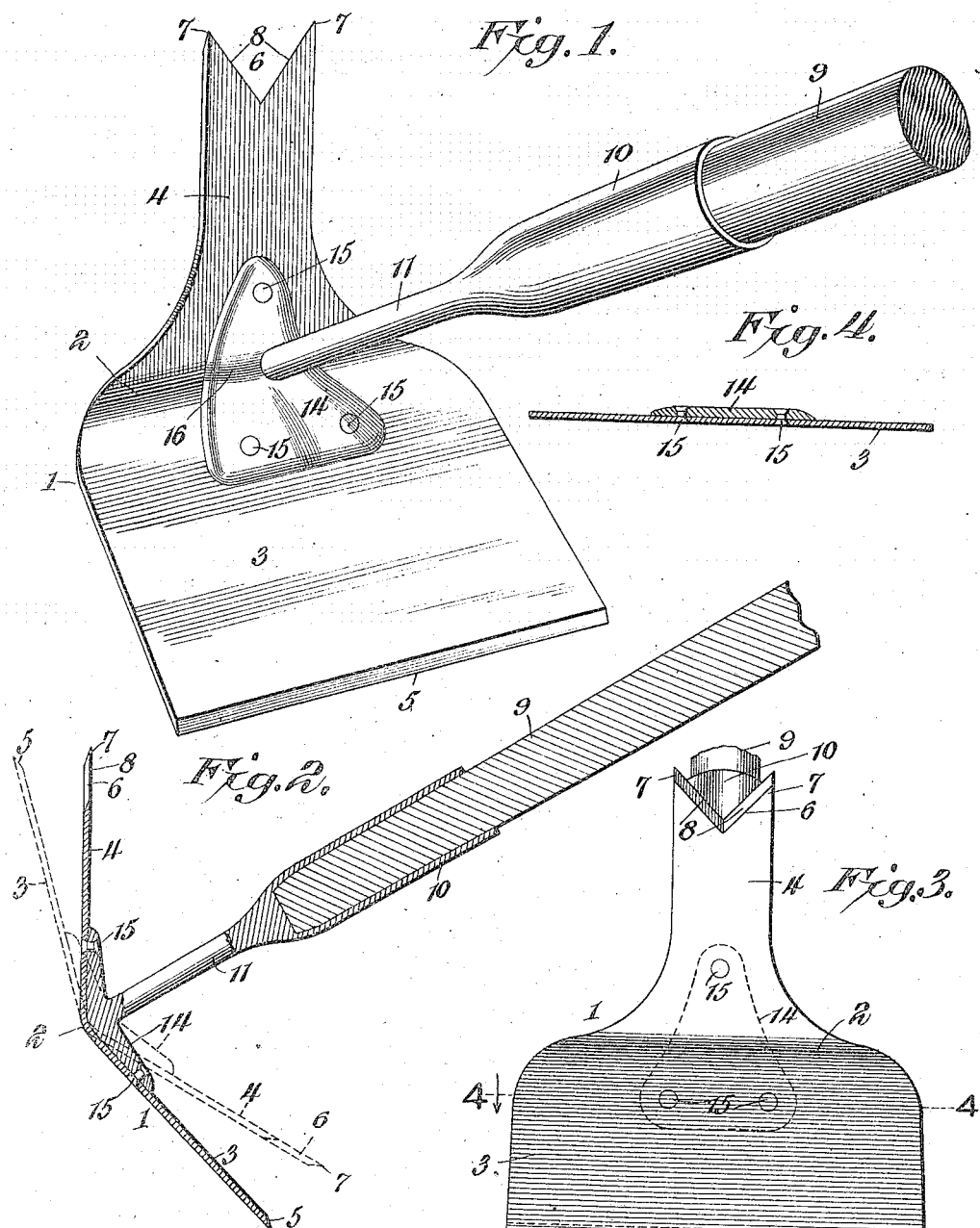

JOHN M. PRINGLE, OF CASSVILLE, WISCONSIN.

GARDEN-HOE.

1,148,534. Specification of Letters Patent. Patented Aug. 3, 1915.

Application filed December 29, 1914. Serial No. 879,504.

*To all whom it may concern:*

Be it known that I, JOHN M. PRINGLE, a citizen of the United States, residing at Cassville, in the county of Grand and State of Wisconsin, have invented a new and useful Garden-Hoe, of which the following is a specification.

The invention relates to improvements in garden hoes.

The object of the present invention is to improve the construction of garden hoes and to provide a simple, practical, and efficient garden hoe of strong and durable construction, designed to avoid hand weeding, and adapted to successfully reach the weeds among plants, especially small ones.

A further object of the invention is to provide a garden hoe of this character equipped with a pair of blades and adapted to be reversed by partially rotating the handle to enable either of the blades to be instantly brought into position for use.

With these and other objects in view the invention consists in the construction and novel combination of parts hereinafter fully described, illustrated in the accompanying drawing, and pointed out in the claim hereto appended, it being understood that various changes in the form, proportion, size and minor details of construction, within the scope of the claim, may be resorted to without departing from the spirit or sacrificing any of the advantages of the invention.

In the drawing:—Figure 1 is a perspective view of a hoe constructed in accordance with this invention. Fig. 2 is a longitudinal sectional view of the same, the dotted lines showing the tilted position of the hoe. Fig. 3 is an end elevation. Fig. 4 is a transverse sectional view on the line 4—4 of Fig. 3.

Like numerals of reference designate corresponding parts in all the figures of the drawing.

In the accompanying drawing, in which is illustrated the preferred embodiment of the invention, the garden hoe comprises in its construction a flat plate or member 1 constructed of sheet steel or other suitable material, and bent transversely at or near the center at 2 to form two straight blades 3 and 4, which are arranged at an obtuse angle to each other. The blade 3, which is provided with an outer cutting edge 5, is designed to be of the width of an ordinary garden hoe, and is adapted to perform the functions thereof. The other blade 4, which is reduced in width to form a narrow blade, is provided at its outer end with an inwardly tapered recess 6, forming a pair of tapering points 7 located at opposite sides of the narrow blade and having inclined or angularly disposed inner edges 8. The inner edges 8 of the points 7 are beveled at the front, and the narrow blade 4 is adapted particularly for weeding among small plants and enables the hoe to successfully reach weeds which usually must be removed by hand when an ordinary hoe is used.

The hoe is provided with a handle 9 fitted in a socket 10 which is provided with a straight shank 11 arranged in alinement with the handle and rigid with the plate or member 1 and extending at the angle or bend 2 thereof. This arrangement of the handle with relation to the plate or member enables either of the blades 3 and 4 to be bent or set at the desired angle with relation to the handle, without affecting or necessitating any change in the position of the other blade, and at the same time, the full length of each blade is available in the use of the implement. The blades are disposed at different acute angles to the handle, but the angle may, of course, be changed if desired. The shank 11 is preferably formed integral with the attaching plate 14, but it may be connected with the same in any other desired manner, and the said plate is secured by rivets or other suitable fastening devices 15 to the rear face of the plate or member 1. The attaching plate 14, which is relatively thick, is beveled at its edges and rounded at its outer face to present a smooth surface to the soil and to enable the blades of the hoe to be driven entirely into the same without being impeded by the attaching plate. The attaching plate, which is preferably triangular, as shown, is bent at an angle at 16 to form two sides or wings, which are arranged at an obtuse angle, corresponding with the angularity of the blades of the plate or member and fitting flat against the same.

What is claimed is:—

A hoe of the class described comprising a plate or member bent transversely at an intermediate point to form two blades which are arranged at an obtuse angle to each other, an attaching plate fitted against the blade or member at the angle thereof and angularly bent to conform to the angularity of the plate or member, means for riveting the said attachment plate to the said plate or member at opposite sides of the bend, and a straight shank formed integral with the attaching plate and provided with a socket for the reception of a handle, the latter being thereby disposed at an acute angle to each of the said blades.

In testimony, that I claim the foregoing as my own, I have hereto affixed my signature in the presence of two witnesses.

JOHN M. PRINGLE.

Witnesses:
M. H. HABERMANN,
G. A. KLINDT.